(12) United States Patent
Lamstaes et al.

(10) Patent No.: US 6,976,368 B1
(45) Date of Patent: Dec. 20, 2005

(54) METHOD AND APPARATUS FOR CONTROLLING REFRIGERATION

(75) Inventors: Andre Lamstaes, Bromley (GB); Guy Lamstaes, Bromley (GB); Harry Banham, Bromley (GB)

(73) Assignee: Universal Master Products Limited, Bromley (GB)

( * ) Notice: Subject to any disclaimer, the term of this patent is extended or adjusted under 35 U.S.C. 154(b) by 0 days.

(21) Appl. No.: 10/130,411

(22) PCT Filed: Nov. 16, 2000

(86) PCT No.: PCT/GB00/04358

§ 371 (c)(1),
(2), (4) Date: May 16, 2002

(87) PCT Pub. No.: WO01/37062

PCT Pub. Date: May 25, 2001

(30) Foreign Application Priority Data

Nov. 16, 1999 (GB) .................................... 9926952

(51) Int. Cl.[7] ............................................ F25B 49/02
(52) U.S. Cl. .................... 62/130; 236/15 BB; 374/134; 62/229
(58) Field of Search ............................. 236/78 R, 1 R, 236/15 BB; 374/134, 149; 62/190, 125, 126, 62/129, 130, 228.1, 229; 99/331

(56) References Cited

U.S. PATENT DOCUMENTS

| | | | |
|---|---|---|---|
| 1,563,104 A * | 11/1925 | Pedersen ..................... 374/134 |
| 2,923,786 A | 2/1960 | Jones ........................... 200/56 |
| 3,964,313 A * | 6/1976 | Connick ..................... 99/342 X |
| 4,003,124 A | 1/1977 | Connick ....................... 29/460 |
| 4,451,726 A * | 5/1984 | Anthony et al. ............. 219/413 |
| 4,468,135 A * | 8/1984 | McCain et al. ......... 374/134 X |
| 4,626,662 A | 12/1986 | Woolf ......................... 219/501 |
| 5,004,355 A | 4/1991 | Ryan ........................... 374/194 |
| 6,502,409 B1 * | 1/2003 | Gatling et al. ................. 62/80 |

FOREIGN PATENT DOCUMENTS

| | | | |
|---|---|---|---|
| DE | 2825353 | 12/1979 | ............. G01K 1/08 |
| DE | 3032864 | 3/1982 | ............. F25D 29/00 |
| EP | 0928935 | 7/1999 | ............. F25D 29/00 |
| GB | 2235780 A | 3/1991 | ............. G01K 3/04 |
| GB | 2240846 | 8/1991 | ............. G01K 11/12 |
| GB | 2286884 A | 5/1994 | ............. G01K 1/20 |
| GB | 1332615 | 10/1997 | ............. G01K 13/00 |
| WO | WO9410546 | 5/1994 | ............. G01K 1/20 |

* cited by examiner

*Primary Examiner*—Harry B. Tanner
(74) *Attorney, Agent, or Firm*—Richard M. Goldberg

(57) ABSTRACT

A thermal sensor (20) located in the centre of a food simulant composition (24) linked to a remote measuring indicating and/or regulating device (28). The temperature of the food simulant changes in the same way as food stored in its vicinity and is unaffected by the movement of the ambient air which varies in temperature dramatically. This allows an actual reading and recording of stored food temperature and the regulation of the temperature within a refrigerated space by a thermostat (16). Its uses are mainly for frozen, chilled and refrigerated food, and the reading of temperature of food cooked for example in micro-wave ovens.

15 Claims, 4 Drawing Sheets

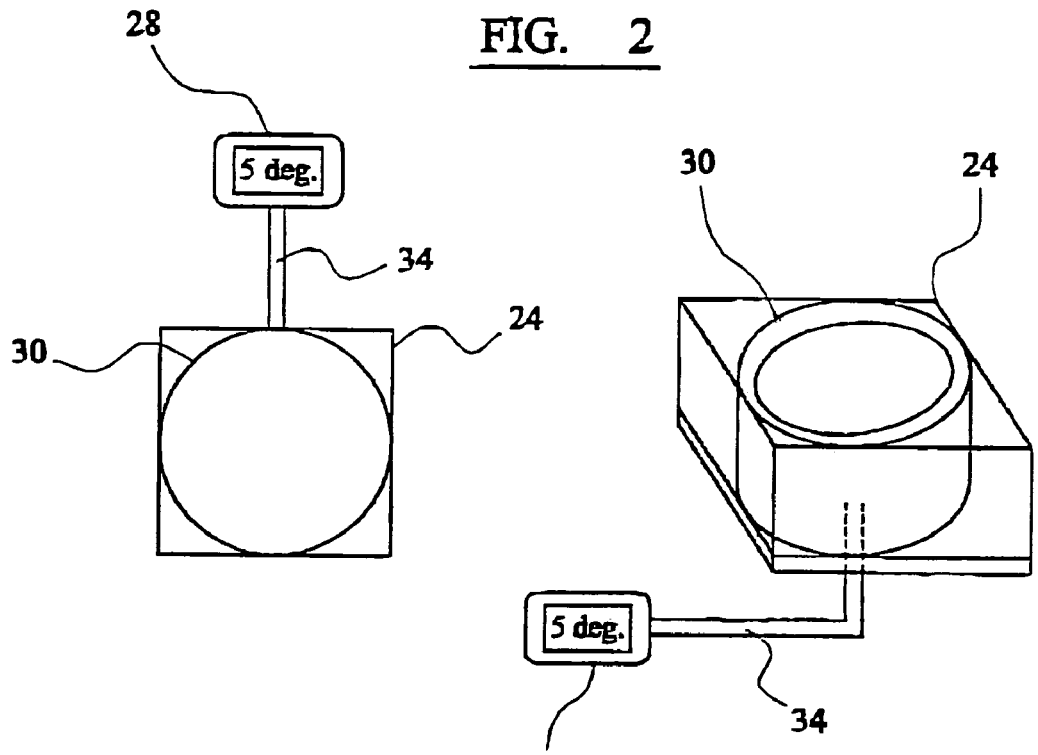
FIG. 2
FIG. 2A
FIG. 2B
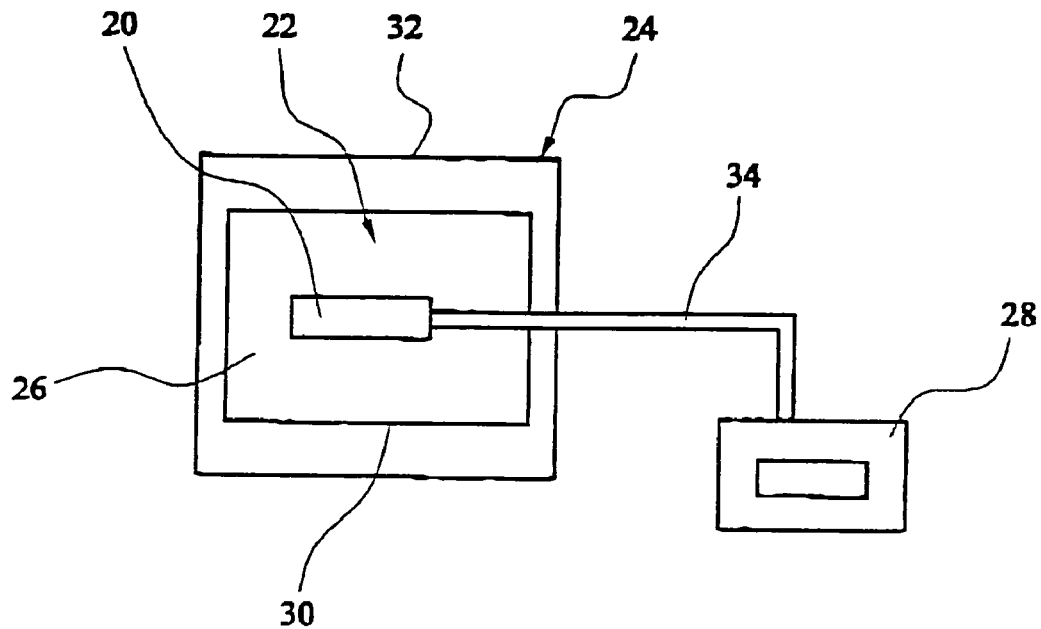
FIG. 3

METHOD AND APPARATUS FOR CONTROLLING REFRIGERATION

BACKGROUND OF THE INVENTION

This invention relates to a method and apparatus for controlling refrigeration apparatus. An example of the application of the invention is to a method and apparatus for controlling the operation of domestic and commercial food storage refrigeration apparatus including deep freeze apparatus. However, the invention also provides, as such, the apparatus which operates in accordance with the aforesaid method for controlling such refrigeration apparatus, and provides temperature sensing apparatus.

Further aspects of the invention relate to the use of the method and apparatus for the control of apparatus for raising the temperature of food and the like, for example microwave cooking apparatus. Further aspects of the invention relate to a method and apparatus for conducting thermal tests and calibration in relation to refrigeration and heating apparatus.

There is disclosed in WO 94/10546 (reference P51957WO) a method and apparatus applicable to temperature sensing in relation to refrigeration equipment in which provision is made for a means to enable visual inspection, of temperature sensing apparatus (for example a conventional bulb and meniscus column-type thermometer) which has been stored in a refrigerator and then removed for inspection, without the attendant inaccuracy of temperature measurement arising from immediate response of the thermometer to the raised air temperature outside the refrigerator or, if such inspection is effected without removal from the refrigerator, the effect of the ingress of external warm air into the refrigerator.

For this purpose, the apparatus of the WO 546 specification provides for the thermometer to be entirely encased within a transparent capsule containing ethylene glycol.

In this way the WO 546 apparatus seeks to offset the effect of sudden changes of air temperature on temperature sensing apparatus used in relation to refrigeration equipment.

In a similar way, the disclosure in DE 30 32 684 A1 provides for the use of a thermal barrier material to surround the temperature sensor in a refrigerator in order that the effect of opening the door of the refrigerator will be cushioned.

In the references cited against the WO 546 specification there are related disclosures concerning the use of thermal inertia and barrier systems for similar or related reasons.

We have discovered that the technical approach adopted in these prior proposals to the sensing of temperatures in refrigeration apparatus and to the control of such apparatus, is technically subject to significant shortcomings in terms of seeking to alleviate the symptoms of the mallaise (inaccurate temperature sensing) without looking to see what is the actual technical step needed for the purpose in terms of the real function of the temperature sensing system.

SUMMARY OF THE INVENTION

In accordance with the principles of our discovery, the proper basis for evaluating the only temperature of interest within a refrigerator (namely the temperature of the food therein enclosed) is to, in essence, sample the food temperature therein. Now, while invasive food temperature sampling by use of inserted probes and the like is fraught with practical difficulties and liberally fenced-around with food hygiene regulations, (so that actual food internal temperature sensing becomes a practical impossibility), we have discovered that there is a practical alternative approach which is not foreshadowed in the prior art, and in accordance with this principle the proper approach to the sensing of such temperatures is by internal sensing within a simulated body of food. Thus, in accordance with this approach, the method and apparatus of the invention provides the means whereby temperature can effectively be sensed from within food stored within the refrigerator, or in the case of a heating system (such as a microwave oven) from within food being heated in such a heating appliance.

By adopting an approach in which, instead of seeking to damp out the effect of incoming warm air and providing instead the means to sense temperature from within the food itself, yet without the hygiene and related problems of invasive probes, there is provided a method and apparatus which has the capability of providing the user with that which he or she actually wants namely the temperature of the food in question.

This latter factor is of great relevance, we have discovered, since although (as the prior art teaches) the air temperature within a refrigerator or deep freeze rises rapidly when the door is opened, the actual effect of the air temperature on the stored food is often quite marginal and there can be a temperature difference between the air and the stored food of 10° C. or more while an unmodified air temperature sensing system in a refrigerator (as is conventionally provided in domestic appliances) will react relatively wildly to such fluctuations, and such is obviously undesirable for energy conservation reasons. Equally there is the converse situation where the approach has been taken that such over-reaction of the temperature control system is ineffective and wasteful, but it is equally true that mere damping of the system is not the effective answer either because damping merely lowers the amplitude of the reactive peaks of the system without addressing the underlying problem or question.

The method and apparatus of the embodiments of the present invention does address that underlying question and provides the means for addressing it in a repeatable and scientifically based manner which avoids the hygiene implications of invasive probes yet addresses the question to be answered directly without merely seeking to ameliorate the technical consequences of the problems which arise in practice with existing apparatus.

Thus in the embodiments of the present invention the temperature sensor is located within a body of food simulant and at a distance from the surface thereof which corresponds to an average stored food article size, with the result that the sensed temperature corresponds closely to that of an article of food located alongside the food-simulant article within the refrigerator.

Of course, in the case of a food article placed in the refrigerator a relatively short time previously, there will be the potential for temperature inaccuracy, but such temperature divergences are inherent in any temperature changing system of the refrigeration or heating kind, and the question to be addressed is how does the system respond (after newly-added articles have temperature-adjusted) to fluctuations caused by door-opening or automatic defrosting or the like?

An important aspect of the embodiments of the present invention concerns the nature of the food simulant material itself, and in the principal embodiments described below the food simulant simulates food by being a material adapted for repetitive use over a significant period (whereby repetitious unacceptable servicing replacement in a regularly used domestic article of this kind is avoided), but which is capable of simultaneously responding thermally in the manner of a foodstuff by being such a material itself. Thus, the embodiments of the present invention as described below provide an exact simulation of the thermal properties of a foodstuff by providing for the selective use of a such a material itself to model the thermal characteristics required to be sensed. In this manner the embodiments enable the apparatus and method to provide a signal which can be used either for controlling refrigeration apparatus or for indicating food temperature, or indeed both, so as accurately to reflect the thermal behaviour of an item of foodstuff place alongside the temperature-sensing and food-simulating article. Actual examples of the materials to be employed are described below. These materials are usually in gel or wax-like format and thus require suitable encasement for practical handling in the refrigeration and/or heating appliance environment. Accordingly, the food simulant material is provided with a casing which typically may comprise a plastic moulding corresponding in size to a typical food article for refrigerational storage in the envisaged use environment, and which may additionally be provided with one or more further layers of material to simulate the thermal effects of packaging which is conventionally employed in relation to articles stored in refrigerators or deep freezers. This latter aspect of the thermal characteristics of the simulated article of food may be incorporated into the overall thermal package without the need for providing specific physical counterparts of the packaging as such. For example, the effect of such packaging might be reasonably closely approximated to by adopting a somewhat larger size for the overall simulated food article. However, such an approach is not strictly in accordance with the principles of some of the embodiments of the present invention, for which the approach is to adopt, for temperature sensing purposes, a simulated food article of a size corresponding to a typical stored food article and having within it not only simulated food with the temperature sensing device therein, but also simulated packaging to correspond with the conventional packaging, but not of course overlooking the requirement for durability in terms of the intended use of the device within the refrigeration or other apparatus over a period of years.

In relation to the temperature sensing devices used in the embodiments of the invention themselves, conventional hardware may be employed and such will usually be in the form of electrically-responsive thermosensor means as employed in known refrigeration apparatus. From such a thermosensor, the output emf may be fed to the control port or input gate of the refrigeration apparatus control system and/or the corresponding connection of a digital or analogue thermal readout.

Thus, using presently available technology, there will usually be a requirement for a hard-wired connection to the thermal sensing device within the food-simulating article and for this purpose suitable convenient and durable means may be provided. For example, in the case where the method and apparatus is employed for the control of the temperature of a refrigerator or deep freeze various approaches may be adopted to the positioning of the sensing article. In one approach the article may be a single article and chosen for placement within the refrigeration cabinet at a suitable location corresponding reasonably closely with that of the food article which will be most likely to affected by the thermal change (such as door opening) with which the system is intended to cope. Alternatively, a series of food-simulating articles may be provided within the thermal cabinet for placement amongst the food articles and with suitable hard-wiring connections, for example disconnectable plug-in connectors, though such is not deemed to be commercially attractive practical option for conventional domestic use, despite the fact that the hard wiring transmits voltages only of the order of millivolts. Alternative technical solutions to the signal transmission question may be evolved including wireless transmission or other transmission systems not requiring the physical use of hard wiring loose connectors. One option might be to provide a series of food-simulating articles plugged into the cabinet of the apparatus at suitable locations and from which the signals would be monitored and evaluated on an overall assessment basis.

Another aspect of the invention relates to the use of the food-simulating article and the contained thermal sensor therein in relation to a method for controlling the operation of refrigeration or deep freeze apparatus so as to achieve significant energy savings in relation to power consumption for driving the pump of conventional refrigeration apparatus. In accordance with this aspect of the invention the control method and apparatus are adapted to provide a degree of control of the refrigerant pump (or other driveable thermal transfer apparatus) such that the extent of operation of the pump matches to a close approximation that which is actually required to produce the desired level of refrigeration of the food, avoiding the peaks and troughs associated with conventional control systems which sense air temperature only and the corresponding thermally damped peaks and troughs of the prior art apparatus discussed above. Thus, these embodiments of the invention provide improved refrigeration unit response pattern (in terms of pump drive periods and/or formal heat transfer quantum per unit time). This result is achieved by providing in accordance with the principles of the invention a refrigerant drive system control signal which is generated on the basis of a food-originating temperature-dependent control signal. This has the result that the power consumption of the refrigerant system matches the actual requirements of the apparatus and its enclosing cabinet instead of being related to relatively irrelevant factors such as the air temperature in the cabinet and/or a perceived requirement to damp the responsiveness of the control system. In this manner there are achieved significant energy savings which tests have indicated will frequently amount to as much as 33% of overall consumption.

Accordingly, the embodiments of this aspect of the invention provide method and apparatus whereby energy conservation is achieved by driving the heat-transfer refrigeration apparatus in accordance with control signals derived from a sensor system providing control based upon signals effectively emanating from the very food within the temperature control cabinet which is to be temperature controlled, such signals being based upon a food simulant, which may indeed be a foodstuff itself, approximating in physical characteristics (including size and heat transfer properties) to an average or typical foodstuff to be stored. In this way there is provided a system in which the power consumption characteristics are based upon a model closely approximating to that which heat transfer theory would devise to conform with the objective of minimisation of fuel consumption for actual food refrigeration purposes.

Likewise a further aspect of the invention provides a method and apparatus adapted to enable calibration of a temperature control system, for example in existing refrigeration apparatus, so as to enable such apparatus to be calibrated to provide a refrigeration effect adapted (with energy-effective control) to achieve specific internal food temperatures.

A still further aspect of the invention provides a method and apparatus applying the above principles in relation to inward heat transfer to food or the like articles as opposed to the above outward hest transfer ie to cooking or heating as opposed to refrigeration.

(Here follows the priority application)

Food Simulant Temperature Measuring Device

This invention is a thermometric device to shadow the temperature of food stored within its vicinity by sensing the temperature of a food simulant which is itself a food product encapsulated in a recipient, without being affected by the changes of the ambient temperature. The invention is a generic product covering different applications involving storage of food and other commodities which must be kept within a specific temperature range.

The invention relates to the method and apparatus applicable 1) to the remote sensing of a food simulant to indicate the temperature of food stored in cold rooms, refrigerated or heated containers and other storage spaces for reading, recordal or other purposes, 2) to regulate through the medium of a thermostat of the temperature of cold rooms, refrigerated or heated containers or other storage areas, 3) to indicate the temperature of food cooked in ovens particularly micro wave ovens.

The invention will ensure that the products stored or cooked are at or within the degrees of temperature suggested or imposed by Health Authorities or other regulated bodies.

Application for Cold Temperature

1) We shall first describe the application for all foods and perishables stored at low temperatures which require a refrigerated element for processing, storage, manufacture transport and the like.

2) The invention is for use in any refrigeration system which suffers thermal shocks in refrigerators, freezers, cold stores, production line cooling and/or freezing, land, sea or air transport and any other refrigerated containers generally offering storage facilities to overcome temperature fluctuations experienced when monitoring air temperature.

3) The problem of obtaining correct food temperature in refrigerated containers occurs because of the frequent and closely spaced sequences of door openings, restocking of food, hot gas or electric defrost, auto-defrost, cleaning and any other causes giving rise to sudden changes in air temperature and consequently of the erratic movement of traditional thermometers—digital or tubular, placed therein. However food temperature will vary only gradually either downwards or upwards over a period of time without being affected by the erratic fluctuation of the air temperature. Consequently monitoring the temperature of the air cannot give any indication of the temperature of the food; comparative readings of air and food temperature in the same container show that they can vary considerably, often by well over 10° C.

4) Misunderstanding the temperature may lead to the finding of unacceptable food standards under existing food hygiene regulations leading to penalties or eventual destruction of the food. It is a well established fact that bacteria becomes active when temperatures exceed 5° C. and multiply rapidly above 8° C. and it is therefore reprehensible to store food to be consumed without ensuring that it has been stored at all times at the right temperature. A probe thermometer will give an accurate reading of food temperature but can cause cross contamination which is a serious health hazard; devastating consequences of cross contamination were in evidence in the John Barr butchers E-coli case (heard in a U. K. Court).

5) The present invention consists of an inner recipient which contains food simulant that has the consistency of average food; this inner recipient consequently represents an average food. In its centre is a temperature sensor device. This inner recipient is enclosed in an outer perforated hard plastic case designed to give an accurate temperature reading of food within an average commercial packaging. The sensor being located at the centre of the device being 16 to 18 mm from its closest surface becomes in effect a thermal probe within its own food. This allows accurate temperature monitoring of food located in the vicinity of the invention, or of the refrigeration running controls as later described. The invention indicates at all times the temperature at 16 mm to 18 mm inside the food simulant and as a corollary within the food stored in its vicinity without damaging said food or risking the real possibility of cross contamination.

6) The invention can be fitted with audible or visual warnings for example when the temperature of the food simulant exceeds its safety limit. The warning could be located either inside a refrigerator or on the outside. Such a device from a temperature recording device stimulated by air would be to all intents and purposes ineffectual because of the constant fluctuations of the air temperature which would trigger each time the warning alarm and cause confusion and irritation to people within hearing distance.

7) A prior proposal in this technical field is to be found in GR 2286884 originating from the present applicant which discloses a system in which a bulb or stem type thermometer is mounted within a transparent container and immersed in a transparent liquid or gel having relatively high terminal inertia so that the indicated temperature provided by the thermometer can be accurately read after the thermometer has been removed from the refrigerator for inspection; the thermal inertia of the liquid or gel surrounding the thermometer serves to maintain the indicated temperature of that thermometer for at least the length of time reasonably required to read and record that temperature.

8) However, this prior proposal does not always meet the needs of commercial establishments where a system for constant monitoring of the temperature within a refrigerated enclosure is needed, together with, if required, a digital monitoring and recordal system, or printed recording or otherwise, of the indicated temperature. A visual inspection system cannot effectively meet such requirements and a different approach is thus required.

9) By providing a device in which temperature determination is effected by means of a remote-sensing thermal probe with associated monitoring/recordal facilities a system is offered whereby the advantages of our prior system mentioned above in terms of temperature determination of actual food as opposed to air temperatures is obtained for commercial or other purposes with many added advantages, and like in the prior system gives the temperature within the food without touching the food itself.

10). The electronic sensor can be connected by electric wire to an external embodiment either permanently or temporarily depending on requirements to check the temperature of the food simulant and thus the food stored in its vicinity, the sensor inserted in the recipient can be connected which will be plugged in as and when the user requires to view the food temperature.

11) The user may need to check the temperature of refrigerated or frozen foods stored in different zones within a refrigerated space to establish temperature variants so that vulnerable products can be stored in more favourable positions for example in a multi-deck self service display refrigerated cabinet where the difference in temperature from base to top can vary quite considerably; inside an average size refrigerated container the difference in temperature can often be 8° C. if not more. The small size of the recipients of the invention will enable the user to place them in different zones of the refrigerated space in order to monitor their temperature; as explained in paragraph 10 this can be done at regular intervals or with a permanent connection.

12) where multiple refrigeration systems are in operation, devices of this kind may be provided in as many locations as required, with the thermal output data routed in a monitoring system permitting monitoring and recordal of temperature data for each location on a time-related basis, whereby a visual display, digital recordal or print out can be obtained indicating temperature levels of food or other refrigerated product in the said locations over a given period of time, regardless of air movement. General temperature fluctuations particularly where there are perishable goods can also be monitored and recorded and any abnormal movements in any particular area immediately signalled.

13) In transportation of goods loaded in refrigerated transport container, their temperature cannot usually be monitored accurately which may lead to disputes between shippers and buyers. The invention will supply the necessary data and confirm the movement of temperature during the voyage including period of transit. Temperature determination is effected by the invention linked to a data transmission conduit such as a conductor or the like transmission device linked to a digital recordal facility. For road transport this can be linked to a warning device as mentioned in 6 above to alert the driver of any unusual temperature fluctuations of the goods.

14) The invention is an ideal and effective method of teaching food monitoring control. It clearly demonstrates the variation between air and food temperature and highlights the difference in temperature of different zones in the refrigerated space thus providing irrefutable proof of the correct food temperature.

15) The invention offers the advantages of great flexibility and consistency in its application. It can be connected to a sophisticated computerised system to which various facilities such as recordal, statistical, breakdown warning systems can be added when required. It offers a low cost method to monitor the true temperature of food stored in several zones of a refrigerated space: by placing a device on the top, middle and lower shelves, each connected to a remote digital read-out, a clear picture is obtained at all times of the efficiency of the refrigeration equipment.

16) Because of the accuracy provided by the right application of the invention another of its benefits is to signal the possibility of the onset of refrigeration failure; if regular monitoring over a period of time of the temperature of the food taken in similar condition of refrigeration shows a slow but continuous rise in temperature, it is likely that a fault is developing in the refrigeration system which should be looked into as soon as possible. The warning could save loss of refrigerated products and possibly reduce the damage to the equipment.

17) An embodiment of the invention detailed in paragraph 5) above will now be described by way of example with reference to the accompanying drawings in which FIG. 1 shows an outer container 3 representing the skin, surface or wrapping of food encapsulating an inner container 4 filled with a composition 5 simulating food, in which is inserted the sensor 6 linked to a read-out 1 indicating the temperature of said substance by a connecting cable 2. The sensor is inserted at about 17 mm within the inner container.

Application for Hot Temperature

18) Food Hygiene Regulations in the EC stipulate that hot food must be kept at a certain minimum temperature. It is usually 63° C. or higher. In some areas like Scotland food that is re-heated must reach 82° C. Probes are usually the only temperature measuring device available.

19) The present invention offers a device which monitors the temperature of the hot food either as a permanent fixture or temporary to be used as and when required. For this application the materials required are different from the ones used in the previous chapter requiring cold temperature but otherwise the principle remains the same.

Application for Thermostat

20) The thermostat regulates the temperature inside the refrigerated space. When the temperature exceed a pre-set level it activates the refrigeration cycle; the mechanism is switched on automatically by the increase of air temperature usually at the air-in. As explained air temperature varies constantly with door openings and other activities associated with refrigeration storage already mentioned which result in frequent power surges as the refrigeration equipment switches on and off causing excessive wear and tear on the system's components, totally unnecessary as the stored food actually retains a stable temperature.

21) The invention uses the principle of food simulation to control the thermostat by encapsulating the sensor in the inner recipient fitted at a distance of 17 mm to its surface to equate the refrigeration to food temperature. With the invention, it is the temperature of the food simulant shadowing the temperature of the food itself stored in its vicinity which activates the refrigeration cycle and therefore ensure that the cooling system functions when is it actually required.

22) When the thermostat is controlled by a food simulant the thermostat changes its operation; tests show that over a period of 6 hours, a thermostat activated by "air sensors" will start the refrigeration cycle an average of 18 times, whereas if activated by food sensors as per our invention the average is reduced to 7 times bringing an appreciable saving in power of about 20 percent and saving on maintenance and wear and tear of the system. It is a fact that the refrigeration and air-conditioning industry is a growing world-wide industry and is an enormous consumer of electricity 20% savings, or indeed any saving will bring large benefits to the environment.

Application for Temperatures Tests in Micro-Wave Ovens

23) Cooking in micro-wave ovens is uncertain due to several factors such as ageing of the micro-wave guide cover or defrosting of food stored at an unknown temperature. Cooking time is calculated to cook unfrozen food, and the defrosting facility is usually based on the recommended freezing temperature of −18 degC/0 degF consequently when food is frozen at a lower temperature, the defrost facility will cease to operate before the food is completely defrosted. The cooling period will therefore start with food still partly frozen which will be insufficiently cooked at the end of the cooking period. The error is caused because it is usually assumed chat freezers maintain the food at the right temperature and that the thermostat read-out is a thermometer readout; the temperature of the food itself is not checked with a reliable food thermometer and the result is a health hazard.

24) In a microwave oven, food is cooked from within and the air temperature is not affected. Consequently the only method to check the food temperature is to use a probe. We have already pointed out the high risks of using probes in food for consumption.

25) The invention consists of a pack of food simulant for food of a particular weight, density and composition, supplied with a temperature sensor to read the temperature of the pack before and after being cooked and comparative tables if required. The object is to test the efficiency of the micro-wave oven.

26) Initially in a chilled state; the invention is designed to be cooked in the micro-wave oven to reach a specific temperature over a set period of time. When the time is over, the temperature of the pack is taken with the sensor. If the temperature of the pack reaches the said specific temperature, the oven cooks satisfactorily. If it does not, the cooking time must be adjusted on the comparative charts supplied with the invention which will then be used to indicate the period of cooking for particular types of food.

27) The pack is taken in a frozen state after being stored in a particular freezer. The procedure as in 26 is repeated. The temperature of the invention is recorded and the pack is then cooked and its temperature again recorded and the cooking time adjusted accordingly. A further check may be advisable based on the new calculation to make sure that the temperature is now correct and eventually rectified and the charts corrected accordingly for future cooking. Since it is not unusual to find that freezers maintain a temperature which is not the recommended one, it is strongly suggested that each freezer is tested with the invention before using the food stored therein and that each is used with its own charts.

28) The invention can be used to effectively calibrate micro-wave ovens by checking its efficiency with the tables supplied with each pack.

BRIEF DESCRIPTION OF THE DRAWINGS

Embodiments of the invention will now be described by way of example with reference to the accompanying drawings in which

FIGS. 2A, 2B and 3 show plan, perspective and sectional views through an embodiment of temperature sensing apparatus employing a thermal sensor within a body of food simulant material;

DETAILED DESCRIPTION

Figure 1:
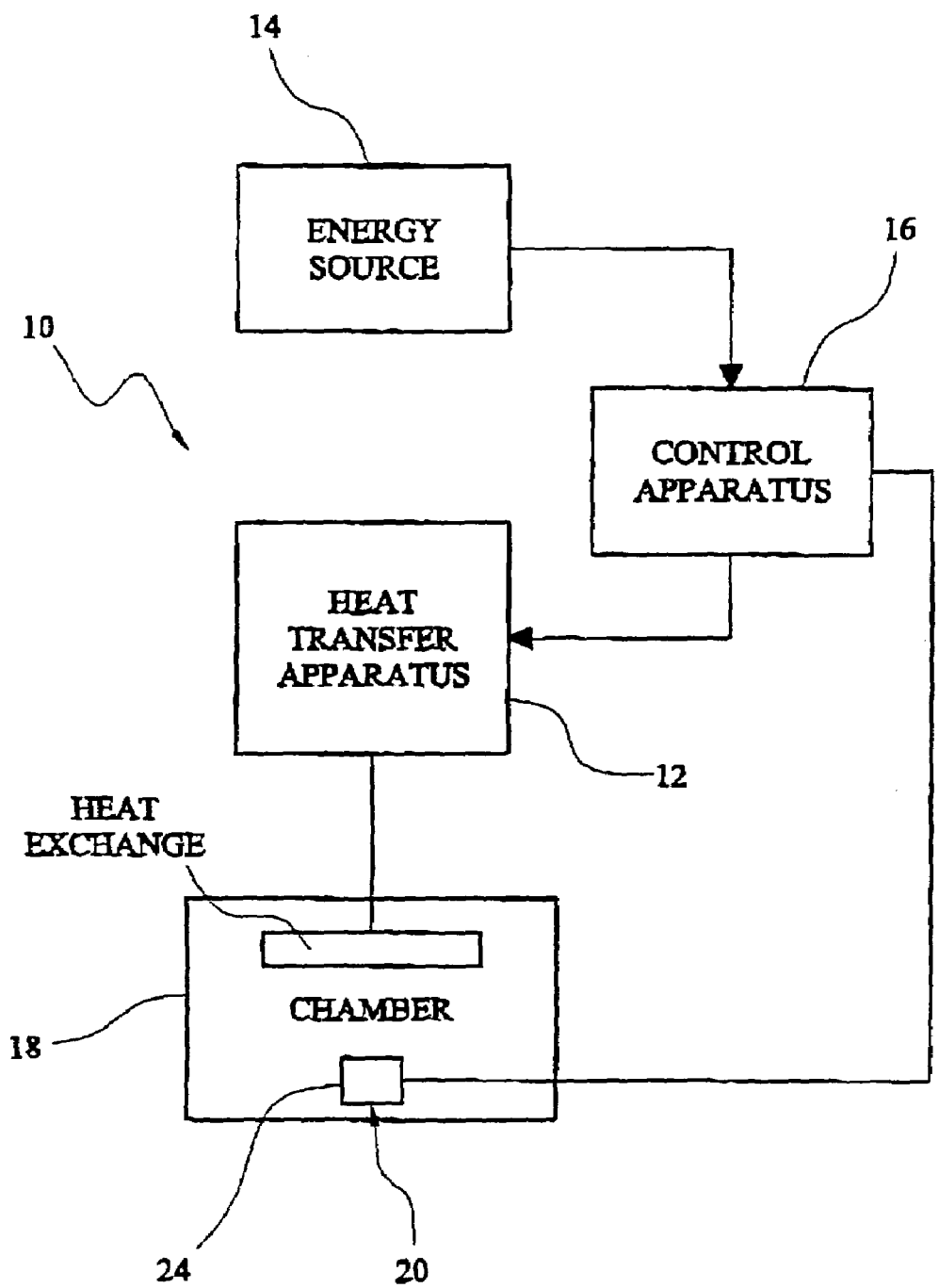
FIG. 1 shows a diagrammatic representation of apparatus for controlling article heat transfer apparatus in accordance with the invention.

As shown in FIG. 1 apparatus 10 for controlling article heat transfer apparatus 12 connectable to an energy source 14 comprises control apparatus 16 to control the operation of the heat transfer apparatus 12 in accordance with sensed thermal characteristics.

A chamber 18 is provided to contain one or more of the articles (not shown) to or from which heat transfer is to be effected, during operation of the heat transfer apparatus.

Chamber 18 is in operative association with the heat transfer apparatus 12 so that the latter can cause heat transfer to or from the chamber and hence to or from articles contained therein.

Control apparatus 16 comprises a thermal sensor 20 responsive to sensed thermal characteristics within the chamber.

Control apparatus 16 further comprises a thermal sink or body 22 associated with sensor 20 and having a thermal capacity to modify the responsiveness of control apparatus 16 to thermal characteristics within chamber 18.

In accordance with the invention, thermal sink or body 22 comprises a temperature sensing food article 24 which is provided within chamber 18 and comprises a body of food-simulant material 26 having thermal sensor 20 located therein and adapted to provide a food-originating temperature-dependent control signal to control apparatus 16 and thus to heat transfer apparatus 12 based upon the temperature within the food simulant material 26 at a defined distance from the surface of food article 24 so as to control the heat transfer apparatus 12 in accordance with a thermal model based on actual required food temperatures.

In this embodiment, energy source 14 is a conventional electrical supply source and such is connected to heat transfer apparatus in the form of the usual refrigeration heat pump operated by control apparatus 16 in the usual way but under the control of thermal sensor 20 in accordance with the principles of the present invention.

Heat transfer apparatus 12 may be provided in the form of refrigeration apparatus or in the form of cooking apparatus for example microwave heating apparatus.

Turning to the nature of food simulant material 26, this may be provided in this embodiment either as a food grade liquid or as a food grade wax such as cheese wax. In the case of a food grade liquid, a suitable example is obtainable from the firm Ellis & Everard in the UK under the trade mark Pricerine 9091, which is a glycerine food grade vegetable oil in the form of an odourless syrupy liquid. It is also known as glycerol food grade vegetable oil.

In the case of the wax material, this may be in the form of cheese wax obtainable in the UK from the British Wax Refining Co Limited of Redhill. For example, cheese wax 2110 grade for dipping/coating cheeses. The wax is a blend comprising a mixture of hydrocarbon waxes and food grade white oil.

Other food grade material may be suitable for the purpose on the basis of the characteristics discussed above and apparent from the two examples disclosed above.

Figure 4:
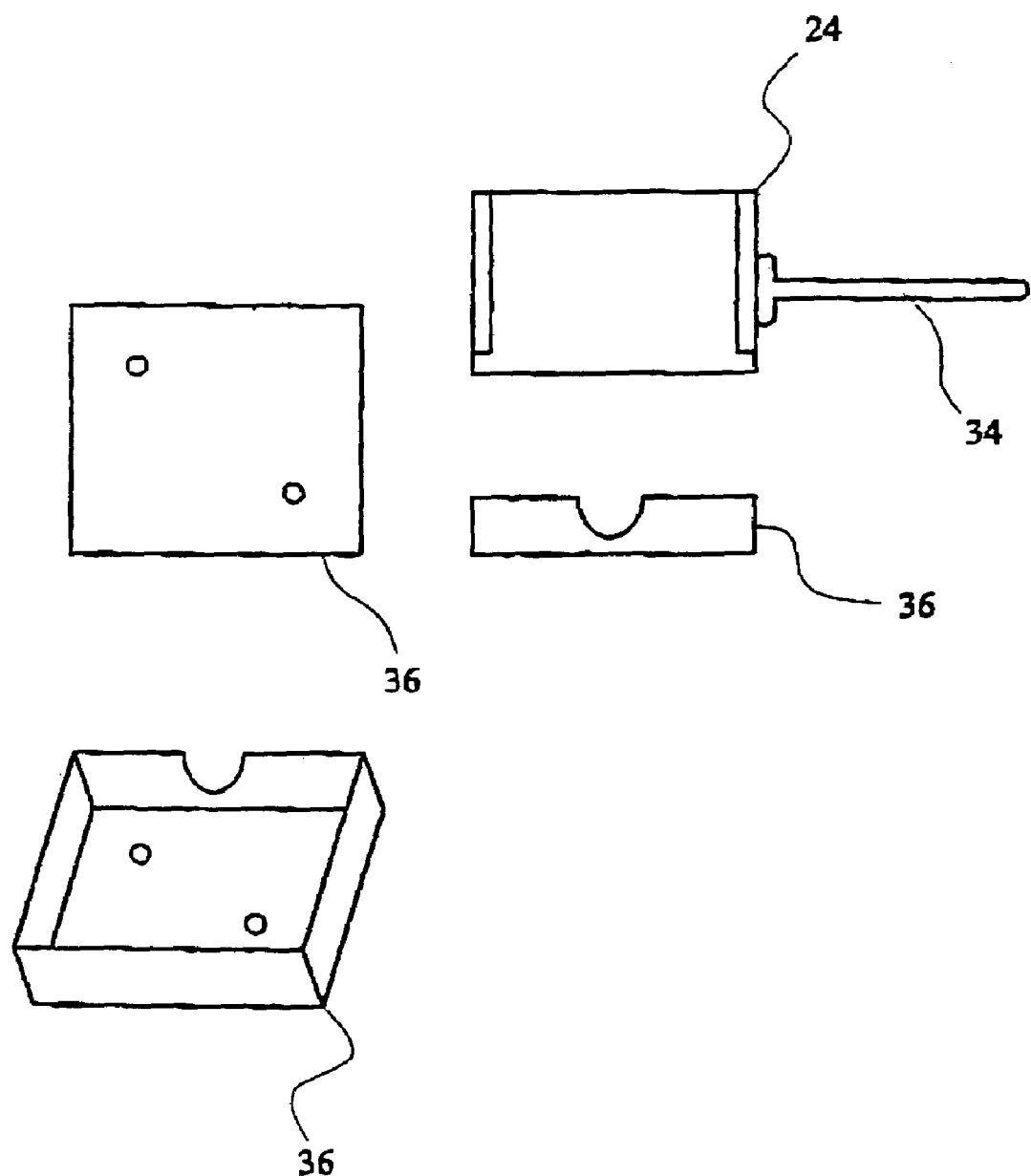
FIG. 4 shows a further embodiment of the thermal sensor of FIGS. 2 and 3.

Turning now to the embodiments shown in FIGS. 2, 3 and 4, these show the thermal sensor 20 of FIG. 1 used instead in association with a digital readout 28. Sensor 20 is located within the body of food-simulant material 26 which is contained by a cylindrical capsule 30 positioned within a rectangular body 32 of simulated packaging material. A bracket 34 mounts readout 28 on the packaging 32 and is capsule 30 and serves as a conduit for hardwiring conductors not shown.

In the embodiment of FIG. 4, there is additionally provided a clip or mounting 36 for screwing or adhering to the refrigeration cabinet.

Capsule 30 and simulated packaging 32 and (34) and clip or mounting 36 may all comprise suitable plastics materials moulded or otherwise.

Figure 6:
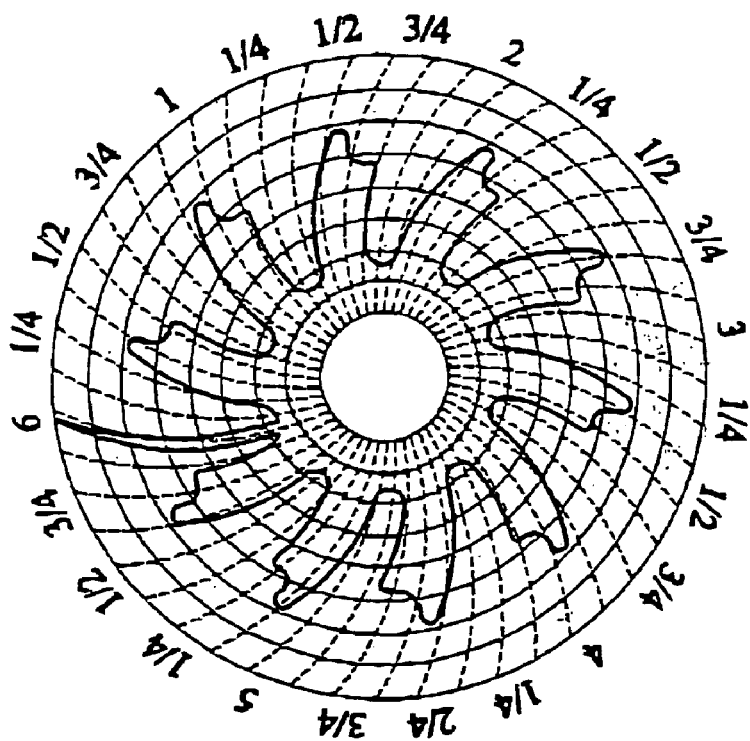
FIGS. 5 and 6 show graphic representations of the operation of prior art apparatus (FIG. 5) and apparatus according to an invention (FIG. 6) illustrating the reduced number of operating cycles within a given period produced by the apparatus of the invention.
Figure 5:
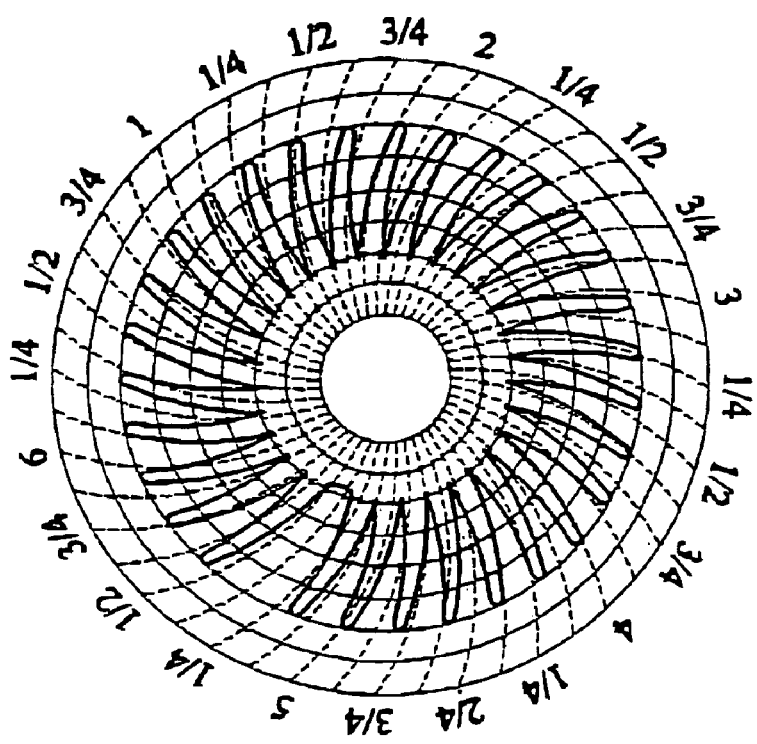

The diagrams of FIGS. 5 and 6 illustrate the mode of operation of the apparatus of FIG, FIG. 6 showing that over a six hour period such apparatus made only 10 starts in terms of commencing operation of the heat transfer apparatus whereas the corresponding conventional equipment shown in FIG. 5 made 30 such starts during a similar period illustrating the significant reduction in use and wear and tear on and energy consumption by the refrigeration apparatus.

The plots of FIGS. 5 and 6 are of temperature against time as sensed from a thermal probe located in condenser equipment of the heat transfer apparatus.

What is claimed is:

1. A method of controlling article heat transfer apparatus comprising the steps of:
   a) providing drivable heat transfer apparatus connectable to an energy source;
   b) providing control apparatus for said heat transfer apparatus to control operation thereof in accordance with sensed thermal characteristics;
   c) providing a chamber to contain at least one article during operation of said heat transfer apparatus;
   d) providing said chamber in operative association with said heat transfer apparatus and causing the latter to effect heat transfer to or from said chamber;
   e) providing said control apparatus comprising a thermal sensor responsive to sensed thermal characteristics within said chamber;
   f) providing said control apparatus further comprising one of a thermal sink and a body associated with said thermal sensor and having a thermal capacity to modify a responsiveness of said control apparatus to thermal characteristics within said chamber; and
   g) said one of said thermal sink and body comprising a temperature-sensing food simulating article provided within said chamber and comprising a body of solid food-simulant material able to retain its shape without the support of an external container and having said thermal sensor located therein in direct contact with the food simulant material, the food simulant material simulating the thermal properties of a foodstuff and adapted to provide a food-simulating temperature-dependent control signal to said heat transfer apparatus based upon the temperature within said food-simulant material at a defined distance from a surface of said food simulating article so as to control said heat transfer apparatus in accordance with a thermal model based on actual required internal food temperature.

2. A method according to claim 1 further comprising the step of providing said heat transfer apparatus comprising refrigeration apparatus.

3. A method according to claim 1 further comprising the step of providing said heat transfer apparatus comprising cooking apparatus.

4. A method according to claim 1, further comprising the steps of:
   providing monitoring apparatus for said heat transfer apparatus to monitor operation thereof in accordance with sensed thermal characteristics;
   providing said monitoring apparatus comprising a further thermal sensor responsive to sensed thermal characteristics within said chamber;
   providing said monitoring apparatus comprising one of a thermal sink and body associated with said further thermal sensor and having a body of solid food simulant material able to retain its shape without the support of an external container and having said thermal sensor located therein in direct contact with the food simulant material, the food simulant material simulating the thermal properties of a foodstuff and adapted to provide a food simulating temperature dependent monitoring signal so as to monitor the heat transfer apparatus in accordance with a thermal model based on actual required internal food temperatures.

5. A method according to claim 4, further comprising the step of:
   providing said monitoring apparatus comprising means for transmission of the monitoring signal to a monitoring/recordal facility; and
   the monitoring/recordal facility recording the monitoring signal.

6. Article heat transfer apparatus according to claim 4, wherein said monitoring apparatus comprises means for transmission of the monitoring signal to a monitoring/recordal facility.

7. For use in the method according to claim 1, a temperature-sensing food simulating article comprising a body of food-simulant having a thermal sensor one of:
   a) located therein, and
   b) adapted for location therein.

8. Article heat transfer apparatus comprising:
   a) drivable heat transfer apparatus connectable to an energy source;
   b) control apparatus for said heat transfer apparatus to control operation thereof in accordance with sensed thermal characteristics;
   c) a chamber to contain at least one article during operation of said heat transfer apparatus;
   d) said chamber being in operative association with said heat transfer apparatus and adapted to cause the latter to effect heat transfer to or from said chamber;
   e) said control apparatus comprising a thermal sensor responsive to sensed thermal characteristics within said chamber;
   f) said control apparatus further comprising one of a thermal sink and a body associated with said thermal sensor and having a thermal capacity adapted to modify a responsiveness of said control apparatus to thermal characteristics of said chamber; and
   g) said one of said thermal sink and body comprising a temperature-sensing food simulating article provided within said chamber and comprising a body of solid food-simulant material able to retain its shape without the support of an external container and having said thermal sensor located therein in direct contact with the food simulant material, the food simulant material simulating the thermal properties of a foodstuff and adapted to provide a food-simulating temperature-dependent control signal to said heat transfer apparatus based upon the temperature within said food-simulant material at a defined distance from a surface of said food simulating article so as to control said heat transfer apparatus in accordance with a thermal model based on actual required internal food temperature.

9. Apparatus according to claim 8 wherein said heat transfer apparatus comprises refrigeration apparatus.

10. Apparatus according to claim 8 wherein said heat transfer apparatus comprises cooking apparatus.

11. Article heat transfer apparatus according to claim 8, further comprising:
   monitoring apparatus for said heat transfer apparatus to monitor operation thereof in accordance with sensed thermal characteristics;
   said monitoring apparatus comprising a further thermal sensor responsive to sensed thermal characteristics within said chamber;
   said monitoring apparatus further comprising one of a thermal sink and body associated with said further thermal sensor and having a body of food simulant material having said thermal sensor located therein in direct contact with the food simulant material, the food simulant material simulating the thermal properties of a foodstuff and adapted to provide a food simulating temperature dependent monitoring signal.

12. An apparatus for monitoring a heat transfer apparatus comprising:
   a) a thermal sensor responsive to sensed thermal characteristics within a chamber;
   b) one of a thermal sink and a body associated with said thermal sensor and comprising a body of solid food simulant material able to retain its shape without the support of an external container and having said thermal sensor located therein in direct contact with the food simulant material, the food simulant material simulating the thermal properties of a foodstuff and adapted to provide a food simulating temperature dependent monitoring signal;
   c) the monitoring apparatus comprising means for transmission of the monitoring signal to a monitoring/recordal facility so as to monitor the heat transfer apparatus in accordance with a thermal model based on actual required internal food temperatures.

13. An apparatus for monitoring according to claim 12, wherein the monitoring/recordal facility includes a computerized system.

14. A method of monitoring article heat transfer apparatus comprising the steps of:
   a) providing drivable heat transfer apparatus connectable to an energy source;
   b) providing monitoring apparatus for said heat transfer apparatus to monitor operation thereof in accordance with sensed thermal characteristics;
   c) providing a chamber to contain at least one article during operation of said heat transfer apparatus;
   d) providing said chamber in operative association with said heat transfer apparatus and causing the latter to effect heat transfer to or from said chamber;
   e) providing said monitoring apparatus comprising a thermal sensor responsive to sensed thermal characteristics within said chamber;
   f) providing the monitoring apparatus comprising a thermal sensor responsive to sensed thermal characteristics within a chamber, the monitoring apparatus comprising means for transmission of the monitoring signal to a monitoring/recordal facility means for transmission of the monitoring signal to a monitoring/recordal facility;
   g) said one of said thermal sink and body comprising a temperature sensing food simulating article provided within said chamber and comprising a body of solid food simulant material able to retain its shape without the support of an external container and having said thermal sensor located therein in direct contact with the food simulant material, the food simulant material simulating the thermal properties of a foodstuff and adapted to provide a food simulating temperature dependent monitoring signal, so as to monitor the heat transfer apparatus in accordance with a thermal model based on actual required internal food temperatures.

15. An apparatus for monitoring according to claim 14, wherein the monitoring/recordal facility includes a computerized system.

\* \* \* \* \*